US006352248B1

(12) United States Patent
Hamaekers et al.

(10) Patent No.: US 6,352,248 B1
(45) Date of Patent: Mar. 5, 2002

(54) HYDRAULICALLY DAMPED BEARING

(75) Inventors: Arno Hamaekers, Gorxheimertal;
Hans-Joachim Rudolf, Stadland;
Arnold Simuttis, Bad Kreuznach, all of (DE)

(73) Assignee: Carl Freudenberg, Weinheim (DE)

( * ) Notice: Subject to any disclaimer, the term of this patent is extended or adjusted under 35 U.S.C. 154(b) by 0 days.

(21) Appl. No.: 09/615,826

(22) Filed: Jul. 13, 2000

(30) Foreign Application Priority Data

Jul. 13, 1999 (DE) .......................... 199 325 82

(51) Int. Cl.$^7$ ................ F16F 5/00; F16F 7/00
(52) U.S. Cl. ................ 267/140.13; 267/141.3
(58) Field of Search .................. 267/140.1, 140.11, 267/140.13, 140.14, 141.3

(56) References Cited

U.S. PATENT DOCUMENTS

| 4,638,981 | A | * | 1/1987 | Sciortino | 267/140.13 |
| 4,836,512 | A | * | 6/1989 | Lun | 267/140.13 |
| 4,854,560 | A | * | 8/1989 | Lun | 267/140.13 |
| 4,907,786 | A | * | 3/1990 | Okazaki et al. | 267/140.13 |
| 5,178,374 | A | * | 1/1993 | Maeno | 267/140.13 |
| 5,560,592 | A | * | 10/1996 | Shimoda et al. | 267/140.13 |
| 5,775,666 | A | * | 7/1998 | Tsukamoto et al. | 267/140.13 |
| 6,158,724 | A | * | 12/2000 | Takashima et al. | 267/140.13 |

FOREIGN PATENT DOCUMENTS

| DE | 3225700 | 11/1983 |
| DE | 3411527 | 10/1984 |
| DE | 3731495 | 4/1989 |
| DE | 3937232 | 5/1991 |
| DE | 4205229 | 9/1993 |
| DE | 4445567 | 12/1997 |
| EP | 0354381 | 2/1990 |
| EP | 0354381 A2 | * 2/1990 |
| JP | 5947541 | 3/1984 |
| JP | 6193674 | 7/1994 |

* cited by examiner

Primary Examiner—Christopher P. Schwartz
Assistant Examiner—Robert A. Siconolfi
(74) Attorney, Agent, or Firm—Milde, Hoffberg & Macklin, LLP

(57) ABSTRACT

A hydraulically damped bearing having a first anchoring member (2) and a second anchoring member (3) that are arranged in a movable fashion to one another, having a spring element (6) operating between the first and second anchoring members (2, 3), and having an operating chamber (10) filled with a damping fluid and a compensation chamber (11) separate from the operating chamber (10) and connected to it via a channel (14) that is defined by the channel walls and that allows the fluid to pass through. The volume of the operating chamber (10) changes due to the relative movement of the first and second anchoring members (2, 3), such that the damping fluid is moved in the channel (14) between the compensation chamber (11) and the operating chamber (10). The operating chamber (10) and the compensation chamber (11) are separated by a separating wall (12) that is impacted on both sides by the damping fluid. This separating wall (12) is held in position at the second anchoring member (3) by a separating object (13), where the separating object (13) includes at least a first and a second separating object element (31, 32) which are adjacent in an axial bearing direction. The separating object elements (31, 32) are braced against each other and form a first radial inner section of the channel wall. A housing section (8) formed onto the second anchoring member (3) forms a radially outer section (18) of the channel wall.

22 Claims, 1 Drawing Sheet

HYDRAULICALLY DAMPED BEARING

BACKGROUND OF THE INVENTION

The invention relates to a hydraulically damped bearing with a first anchoring member and a second anchoring member that are arranged in a movable fashion to one another, with a spring element operating between the first and second anchoring members, with an operating chamber filled with a damping fluid and a compensation chamber separate from the operating chamber and connected to it via a channel that is defined by the channel walls and that allows the fluid to pass through. The volume of the operating chamber changes due to the relative movement of the first and second anchoring members, such that the damping fluid is moved in the channel between the compensation chamber and the operating chamber. The operating chamber and the compensation chamber are separated by a separating wall that is impacted by the damping fluid. This separating wall is held in position at the second anchoring member by a support object, where the support object includes at least a first and a second support object element which are adjacent in an axial bearing direction. The support object elements are braced against each other and form a first radial inner section of the channel wall.

A hydraulically damped bearing of this type is known from the German Patent No. DE 39 37 232 A1.

With the known hydraulically damped bearing, an elastic separating wall is provided between the operating chamber and the compensation chamber to isolate the higher-frequency vibrations stimulated by the motor. The open surface of the separating wall, that is, the surface of the separating wall facing the operating chamber, which is impacted by the damping fluid, is significantly smaller than the feed cross-section of the spring element. A relative movement of the first and the second anchoring members would change the volume of the operating chamber by moving the end of the operating chamber formed by the spring element and the first anchoring member towards the separating wall or away from the separating wall. Specified as the feed cross-section of the spring element is the area of an auxiliary piston that would displace the same volume upon moving the piston as the spring element and the first anchoring member.

With the bearing known from the aforementioned German Patent No. DE 39 37 232 A1, the open surface of the separating wall is significantly smaller than the feed cross-section. The structural space for the elastic separating wall is limited in that the damping channel is located in the support object stretching in a radial direction around the separating wall. The disadvantage of the bearing known from this German patent is that the progression of the dynamic spring rate is not yet optimal in the high frequency range between 150 and 600 Hz.

The German Patent No. DE 42 05 229 discloses a hydraulically damping rubber bearing having a first and a second anchoring member that are arranged in a movable fashion to one another, having a spring element operating between the first and second anchoring members, and having an operating chamber filled with a damping fluid and a compensation chamber separate from the operating chamber and connected to it via a channel that is defined by the channel walls and that allows the fluid to pass through. The volume of the operating chamber changes due to the relative movement of the first and second anchoring members, such that damping fluid is moved in the channel between the compensation chamber and the operating chamber. The operating chamber and the compensation chamber are separated by a separating wall that is formed by a support object and impacted by the damping fluid. The channel connecting the operating chamber and the compensation chamber is formed in an outer section of the one-piece support object and is defined, on the one hand, by the support object and, on the other hand, by a chamber housing that is located radially on the outside.

SUMMARY

It is the objective of the invention to provide a hydraulically damped bearing that exhibits a particularly well suited progression of the dynamic spring rate, in particular in the high frequency range between 150 and 600 Hz.

This objective is achieved with a hydraulically damped bearing of the type described above, wherein a housing section that is formed at the second anchoring member forms a second radial outer section of the channel wall.

The present invention for the first time demonstrates how an enlargement of the open surface of the elastic separating wall can be achieved for a two-part design of the support object as well. With the housing section that is formed at the second anchoring member forming a radial outer section of the channel wall, the channel can be positioned further out in a radial direction. In this manner, it is possible to enlarge the open surface of the separating wall without shortening the channel length. A great channel length is of primary importance for effective vibration isolation of low-frequency vibrations.

According to one advantageous embodiment, it is provided that the support object is held in place in an axial bearing direction by a seating formed at the second anchoring member and in the radial direction of the housing section that at least partially surrounds the support object.

An additional improvement is achieved in that the housing section in the contact area of the support object, at least in a section, is tapered such that the support object is pressed against the seating. In this manner, the support object is held against the second anchoring member in a simple fashion.

According to a particularly advantageous embodiment of the invention, it is provided that the first support object portion that is in contact with the housing section is braced against the second support object portion that faces the seating through the tapered housing section. This design results in a particularly large open surface of the separating wall, because the channel that is limited by the first and the second support object element can be placed in a radial direction far to the outside, which increases the space for the elastic separating wall in the structural space.

According to a further development of this invention, an elastically sealing coating is included in the contact area of the first support object portion at the housing section. This not only permits bracing the two support object elements against one another under an elastic force, but at the same time dependably sealing the channel against the operating chamber as well.

Manufacturing costs are lowered in that the spring element is made of rubber and the elastically sealing coating is designed in one piece together with the spring element.

A high stability of the bearing is achieved in that the second support object element is held in direct contact to the seating by a connecting section of the second anchoring member.

Advantageously, the separating wall is braced between the two support object portions.

To avoid excessive movement of the separating wall, it is provided that an aperture plate that supports the separating wall is placed at least on one side of the elastically designed separating wall.

An additional increase of the open surface of the separating wall can be achieved in that the separating wall is located in a recess of the support object and is held by a holding section of the support object that protrudes into the recess. The area of the separating wall that is in contact with the damping fluid can be increased, because the holding sections protrude only in certain areas into the recess.

According to an advantageous embodiment, it is provided that the channel stretches essentially in a radial direction concentric to the housing section.

Furthermore, it can be provided that the compensation chamber is defined by a formable element, especially one designed in the fashion of a rolling bellows that is braced between the seating and the support object. Manufacturing is simplified by the bracing being carried out in a fashion where the support object contacts the seating directly, because the thickness of the formable element of one bracing location has no influence on holding together the individual elements of the second anchoring member.

A particularly space-saving design is achieved in that the radial outer section of the channel wall, an outer section of the separating object and an outer section of the rolling bellows are arranged in an axial direction next to one another.

For a full understanding of the present invention, reference should now be made to the following detailed description of the preferred embodiments of the invention as illustrated in the accompanying drawing.

DESCRIPTION OF THE PREFERRED EMBODIMENTS

Figure 1:
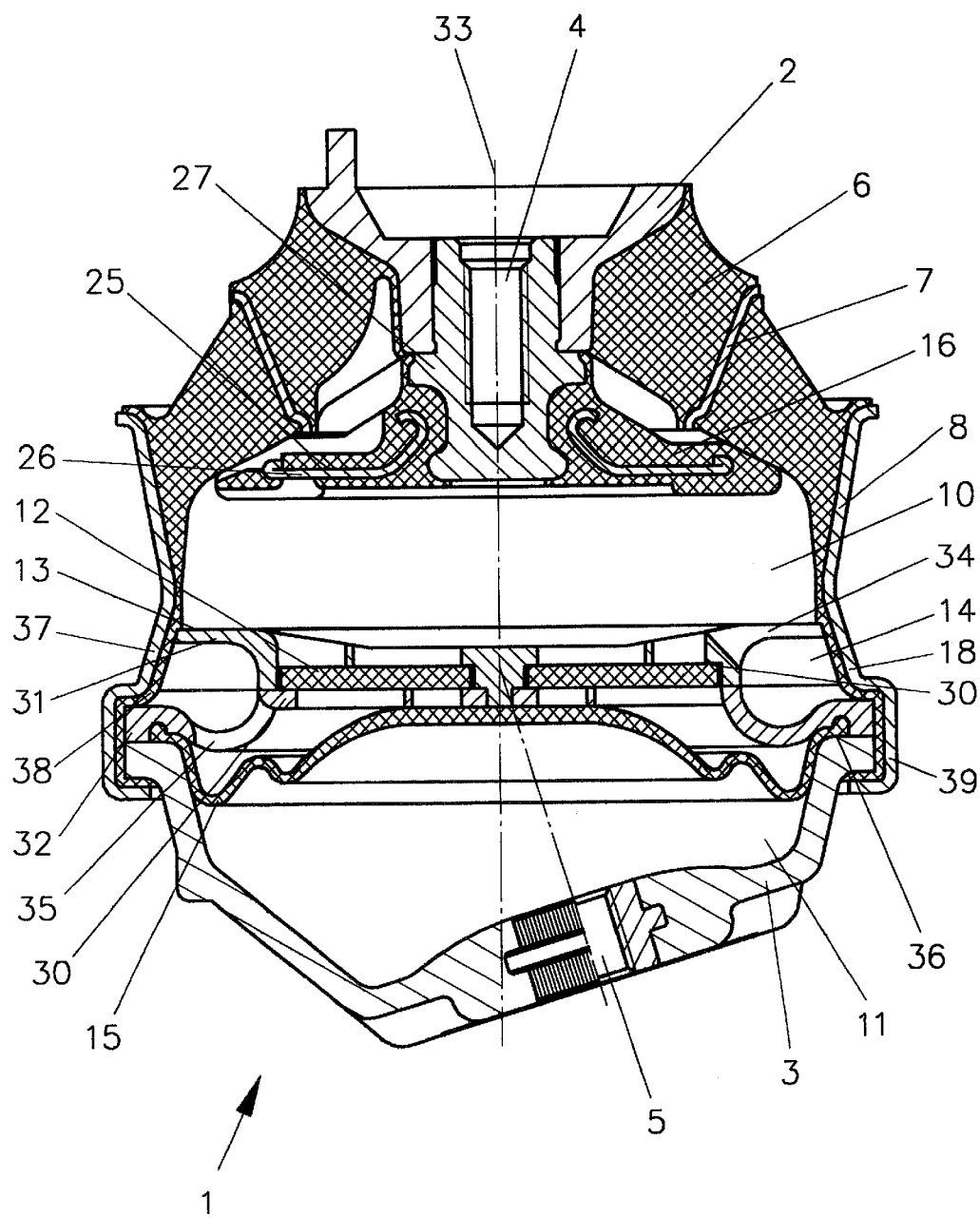
FIG. 1 shows a cross-section through a hydraulically damped bearing according to the invention.

The preferred embodiments of the present invention will now be described with reference to single figure of the drawing.

FIG. 1 shows a hydraulically damping bearing 1 with a first anchoring member 2 and a second anchoring member 3 that is movable in relation to the first anchoring member 2. The bearing can, for example, be connected to a motor and to a body (not shown) via the anchoring members 2, 3 that are made of metal, where the attachment is carried out using the holes 4 and 5.

A spring element 6 is provided between the first and the second anchoring members 2, 3, which is designed as a rubber object. Essentially, the ring-shaped rubber object has the shape of a truncated cone, where the in radial direction outer end is connected with the second anchoring member 3, and the in radial direction inner end with the first anchoring member 2. The spring element 6 may be connected to the first and the second anchoring members 2, 3 by vulcanization. A support ring 7 that separates the rubber object into a radial inner section and a radial outer section is incorporated in the rubber object, which forms the spring element 6.

The second anchoring member 3 exhibits a housing section 8 that surrounds the bearing axis 9 in the shape of a ring. The spring element 6 is seated at the end of the housing section 8 that faces the first anchoring member.

An operating chamber 10 and a compensation chamber 11 are included in the space that is defined by the housing section 8. The operating chamber 10 is separated from the compensation chamber 11 by a separating wall 12 that is supported by a separating object 13. The operating chamber 10 and the compensation chamber 11 are filled with damping fluid and are connected with one another via a damping channel 14 that allows the fluid to flow between the two chambers.

The operating chamber 10 is defined by the first anchoring member 2, the spring element 6, the housing section 8, the separating wall 12 and the separating object 13. The compensation chamber 11 is defined by the side of the separating wall 12 that is facing away from the operating chamber 10 and the separating object 13 as well as by an elastic membrane 15 that is designed in the fashion of a rolling bellows.

With a relative movement between the first anchoring member 2 and the second anchoring member 3, the volume of the operating chamber 10, which is entirely filled with the damping fluid, changes such that the damping fluid is moved through the damping channel 14 between the operating chamber 10 and the compensation chamber 11. The elastic membrane 15 makes it possible that a changing volume of the damping fluid can be gathered in the compensation chamber 11. When vibrations are introduced into the bearing 1, a reduction of the vibrations is achieved by the damping fluid that is included in the damping channel 14 being set into vibration as well, when the natural frequency of the damping fluid in the damping channel 14 is stimulated. Here, it is advantageous if the mass of the damping fluid that moves in the fluid channel 14 is relatively great. This can be achieved by a particularly long damping channel 14.

The separating wall 12 that separates the operating chamber 10 from the compensation chamber 11 is designed as an elastic membrane. Damping fluid is acting upon both of its sides.

The separating object 13 is designed in two pieces and exhibits a first separating object element 31 and a second separating object element 32. The separating wall elements 31, 32 are arranged in the direction of the bearing axis 33 adjacent to one another and contacting one another.

A separating wall 12 designed as an elastic membrane is suspended between the separating object elements 31, 32. It is held essentially vertical to the bearing axis 33 by the holding elements 30 that are integrated in the first and second separating object elements 31, 32. The holding sections 30 are designed such that the elastic separating wall 12 is in contact with the damping fluid with as large a portion of its entire surface as possible. This results in a large open surface of the separating wall 12, that is the surface of the separating wall 12 facing the operating chamber 10 that is spared by the holding sections 30 and that is in contact with the damping fluid.

An additional enlargement of the open surface of the separating wall 12 is achieved through the space-saving design of the separating object elements 31, 32 in their outer areas as described below. In this manner, a separating wall 12 with a larger surface can be placed between the separating object elements 31, 32 with an unchanging length of the damping channel 14.

The radially outer radial area of the separating object elements 31, 32 is designed such that a damping channel 14 is formed that stretches essentially in the radial direction. The damping channel 14 is connected with the operating chamber 10 through an opening 34 that is designed into a first section of the damping channel 14 and with the compensation chamber 11 through a second opening 35 that is designed into the second section of the damping channel 14. The channel wall of the damping channel 14 is formed in a first radial inner section by the separating object elements 31, 32 and in a second radial outer section by housing section 8 that is that is formed onto the second anchoring member 3. Thus, the section of the channel wall that is formed by the separating object elements 31, 32 has essentially the shape of a radially to the outside open U with the created opening area being closed up by the housing section 8.

The separating object 13 that is formed by the separating object elements 31, 32 is held in the direction of the bearing axis 33 by a seat 36 formed at the second anchoring member 3. In the radial direction of the position, the separating object 13 is held in a defined position by the housing section 8. In the area of contact of the separating object element 31 assigned to be closer to the first anchoring member 2, the housing section 8 is tapered such that the separating object element 31 is braced against the second separating object element 32 that is closer to the seat 36 by the tapered housing section 37. An elastically sealing coating 38 is provided in the area of contact of the first separating object element 31 with the housing section 8, where said coating on the one hand seals the damping channel 14 at the contact points between separating object element 31 and housing section 8 and on the other hand provides a tolerance compensation. The elastic coating 38 is manufactured in one piece with the spring element 6 that is made of rubber.

The second separating object element 32 is held in positive contact to the seat 36 by a connecting section 39 of the second anchoring member 3. A radially outer thicker area of the rolling bellows 15 is suspended in a sealing fashion between the second separating object element 32 and the seat 36.

A displacer 16 that stretches into the operating chamber 10 is located at the first anchoring member 2 in the damping fluid. The displacer 16 together with the anchoring member 2 is movable in relation to the second anchoring member 3.

The displacer 16 basically consists of an elastomer 25 and includes a support object 26 made of metal embedded in it. The displacer 16 is attached to the first anchoring member 2 via a peg 27.

The displacer 16 is designed in the fashion of a stop that limits the movement between the first and second anchoring members 2, 3. With a fully spring-loaded bearing 1, the displacer contacts the support object 13.

There has thus been shown and described a novel hydraulically damped bearing which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A hydraulically damped bearing, comprising in combination:
    (a) a first anchoring member and a second anchoring member that are arranged in a movable fashion to one another,
    (b) a spring element operating between the first and second anchoring members,
    (c) an operating chamber filled with a damping fluid and a compensation chamber separate from the operating chamber and connected to it via a channel that is defined by channel walls and that allows the fluid to pass through, wherein the volume of the operating chamber changes due to the relative movement of the first and second anchoring members, such that the damping fluid is moved in the channel between the compensation chamber and the operating chamber,
    (d) a separating wall, disposed between the operating chamber and the compensation chamber, which is impacted on both sides by the damping fluid,
    (e) a separating object that holds said separating wall in position at the second anchoring member, the separating object including at least a first and a second separating object element which are adjacent in an axial bearing direction, and which form a first radial inner section of the channel wall, and
    (f) a housing section disposed on the second anchoring member forming a radially outer section of the channel wall, wherein the second separating object element is held in position in the axial bearing direction by a seat that is formed on the second anchoring member and by a connecting section of the second anchoring member, wherein the second separating object element is delimited in the radial bearing direction by the housing section that at least partially surrounds the separating object, and wherein the first separating object element is braced against the second separating object element by a tapered region of the housing section.

2. Bearing as set forth in claim 1, wherein the housing section in the contact area of the separating object is at least partially tapered such that the separating object is pressed against the seat.

3. Bearing as set forth in claim 1, wherein an elastically sealing coating is provided in the contact area of the first separating object element at the housing section.

4. Bearing as set forth in claim 3, wherein the spring element is made of rubber and the elastically sealing coating is designed in one piece with the spring element.

5. Bearing as set forth in claim 1, wherein the second separating object element is held in positive contact with the seat by a connecting section of the second anchoring member.

6. Bearing as set forth in claim 1, wherein the separating wall is suspended between the two separating object elements.

7. Bearing as set forth in claim 6, wherein an aperture plate that supports the separating wall is placed at least on one side of the elastically designed separating wall.

8. Bearing as set forth in claim 6, wherein the separating wall is located in a recess of the separating object and is held by holding sections of the separating object that protrude into the recess.

9. Bearing as set forth in claim 1, wherein the channel runs substantially in a radial direction concentric to the housing section.

10. Bearing as set forth in claim 1, wherein the compensation chamber is formed by a rolling bellows that is braced between the seat and the separating object.

11. Bearing as set forth in claim 10, wherein the radially outer section of the channel wall, an outer section of the separating object and an outer section of the rolling bellows are arranged in an axial direction next to one another.

12. A hydraulically damped bearing, comprising in combination:
    (a) a first anchoring member and a second anchoring member that are arranged in a movable fashion to one another, (b) a spring element operating between the first and second anchoring members, (c) an operating chamber filled with a damping fluid and a compensation chamber separate from the operating chamber and connected to it via a channel that is defined by channel walls and that allows the fluid to pass through, wherein the volume of the operating chamber changes due to the relative movement of the first and second anchoring members, such that the damping fluid is moved in the channel between the compensation chamber and the operating chamber, (d) a separating wall, disposed between the operating chamber and the compensation chamber, which is impacted on both sides by the damping fluid, (e) a separating object which holds said separating wall in position at the second anchoring member, the separating object including at least a first and a second separating object element which are adjacent in an axial bearing direction, which are braced against each other and which form a first radial inner section of the channel wall, and (f) a housing section disposed on the second anchoring member forming a radially outer section of the channel wall, wherein the separating object is held in position in the axial bearing direction by a seat that is formed onto the second anchoring member an in a radial bearing direction by a housing section that at least partially surrounds the separating object, and wherein the housing section in the contact area of the separating object is at least partially tapered such that the separating object is pressed against the seat.

13. A hydraulically damped bearing, comprising in combination:

(a) a first anchoring member and a second anchoring member that are arranged in a movable fashion to one another, (b) a spring element operating between the first and second anchoring members, (c) an operating chamber filled with a damping fluid and a compensation chamber separate from the operating chamber and connected to it via a channel that is defined by channel walls and that allows the fluid to pass through, wherein the volume of the operating chamber changes due to the relative movement of the first and second anchoring members, such that the damping fluid is moved in the channel between the compensation chamber and the operating chamber, (d) a separating wall, disposed between the operating chamber and the compensation chamber, which is impacted on both sides by the damping fluid, (e) a separating object which holds said separating wall in position at the second anchoring member, the separating object including at least a first and a second separating object element which are adjacent in an axial bearing direction, which are braced against each other and which form a first radial inner section of the channel wall, and (f) a housing section disposed on the second anchoring member forming a radially outer section of the channel wall, wherein the separating object is held in position in the axial bearing direction by a seat that is formed onto the second anchoring member and in a radial bearing direction by a housing section that at least partially surrounds the separating object, and wherein the first separating object element that contacts the housing section is braced against the second separating object element that faces the seat through a tapered portion of the housing section.

14. Bearing as set forth in claim 13, wherein an elastically sealing coating is provided in the contact area of the first separating object element at the housing section.

15. Bearing as set forth in claim 14, wherein the spring element is made of rubber and the elastically sealing coating is designed in one piece with the spring element.

16. Bearing as set forth in claim 15, wherein the second separating object element is held in positive contact with the seat by a connecting section of the second anchoring member.

17. Bearing as set forth in claim 16, wherein the separating wall is suspended between the two separating object elements.

18. Bearing as set forth in claim 17, wherein an aperture plate that supports the separating wall is placed at least on one side of the elastically designed separating wall.

19. Bearing as set forth in claim 17, wherein the separating wall is located in a recess of the separating object and is held by holding sections of the separating object that protrude into the recess.

20. Bearing as set forth in claim 13, wherein the channel runs substantially in a radial direction concentric to the housing section.

21. Bearing as set forth in claim 13, wherein the compensation chamber is formed by a rolling bellows that is braced between the seat and the separating object.

22. Bearing as set forth in claim 13, wherein the radially outer section of the channel wall, an outer section of the separating object and an outer section of the rolling bellows are arranged in an axial direction next to one another.

* * * * *